United States Patent
Harris (10) Patent No.: US 10,284,338 B2
(45) Date of Patent: May 7, 2019

(54) TECHNIQUES FOR OPTIMIZING BROADCAST MESSAGING IN A NETWORK

(71) Applicant: Landis+Gyr Innovations, Inc., Alpharetta, GA (US)

(72) Inventor: Lawrence Harris, Duluth, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 71 days.

(21) Appl. No.: 15/691,451

(22) Filed: Aug. 30, 2017

(65) Prior Publication Data

US 2019/0068330 A1 Feb. 28, 2019

(51) Int. Cl.
| | | |
|---|---|---|
| H04L 29/06 | (2006.01) | |
| H04W 48/10 | (2009.01) | |
| H04L 1/00 | (2006.01) | |
| H04B 1/69 | (2011.01) | |
| H04W 84/18 | (2009.01) | |

(52) U.S. Cl.
CPC .............. *H04L 1/0091* (2013.01); *H04B 1/69* (2013.01); *H04L 69/22* (2013.01); *H04B 2001/6908* (2013.01); *H04W 84/18* (2013.01)

(58) Field of Classification Search
CPC ... H04L 1/0091; H04L 69/22; H04L 12/1886; H04L 65/4076; H04L 45/16; H04L 12/1845; H04L 2012/5642; H04B 1/69; H04B 2001/6908; H04W 84/18; H04W 4/06; H04W 36/007; H04H 20/08; H04H 20/10; H04H 20/16; H04H 20/18; H04H 20/20; H04H 20/22; H04H 20/61; H04H 20/71

See application file for complete search history.

(56) References Cited

U.S. PATENT DOCUMENTS

| | | | | |
|---|---|---|---|---|
| 7,590,757 | B2 * | 9/2009 | Jinzaki .................... | H04L 12/18 709/201 |
| 9,408,052 | B2 * | 8/2016 | Drapkin .................. | H04W 4/90 |
| 9,794,751 | B1 * | 10/2017 | Devarayanigari .... | H04W 4/023 |
| 2004/0098448 | A1 * | 5/2004 | Fukushima ......... | H04L 12/1836 709/201 |
| 2007/0021099 | A1 * | 1/2007 | Sato ..................... | H04B 1/3805 455/404.1 |
| 2017/0149517 | A1 * | 5/2017 | Xie ..................... | G06K 9/00288 |
| 2017/0164372 | A1 * | 6/2017 | Gupta .................... | H04W 4/06 |

* cited by examiner

*Primary Examiner* — Hoang-Chuong Q Vu
(74) *Attorney, Agent, or Firm* — Kilpatrick Townsend & Stockton LLP (57) ABSTRACT

Disclosed are various embodiments for optimizing broadcast messaging for a node. The node receives data for a message from the network. While the data for the message is being received and upon completion of an initial portion of the message, the node determines identification information for the message specified in the initial portion. When (i) the identification information specifies that the message is a broadcast message and (ii) an identifier in the message matches a stored identifier of a previously received broadcast message, the node terminates receiving the data for the remainder of the message. Alternatively, when (i) the identification information specifies that the message is a broadcast message and (ii) the identifier in the message does not match any stored identifier of a previously received broadcast message, the node continues receiving data for the subsequent portion of the message and stores the identifier for the broadcast message.

20 Claims, 5 Drawing Sheets

TECHNIQUES FOR OPTIMIZING BROADCAST MESSAGING IN A NETWORK

BACKGROUND

In some networks, such as a wireless mesh network defined by the Institute of Electrical and Electronics Engineers (IEEE) 802.15.4 family of standards, channel hopping may be used such that nodes in the network typically communicate data over a designated channel that changes on a scheduled time interval. For example, as occurs in Time-Slotted Channel Hopping (TSCH) networks where a node transitions or "hops" from one channel to another on a time interval, such as 25 ms. In such networks, a message may be transmitted addressed as a broadcast message to be received by the nodes in the network. Some of the broadcast messages exceed the amount of data that can be transmitted in a single frame such that the message spans across two or more frames. In this circumstance, the message is broadcast on the same channel from start until completion, even if the broadcast overlaps with a scheduled channel transition time. As a result, receiving a broadcast message may cause a node to temporarily deviate from tuning to the scheduled channel transitions and possibly miss other messages that are transmitted on the scheduled channels.

The negative effects are amplified for networks that require each node to re-broadcast a received broadcast message to the network, as the other nodes in the network completely receive the broadcast message before determining if the broadcast message is a duplicate. Consequently, transmission of broadcast messages to the network can result in many nodes temporarily deviating from tuning to scheduled channel transitions and, as re-broadcasting occurs, unnecessarily missing other possible data transmissions in the network. What is needed is an optimization for receiving broadcast messages that diminishes unnecessary deviations from the network channel hopping schedule of the nodes.

SUMMARY

Various aspects of the present invention relate to optimizing broadcast messaging for a node in a network. In one implementation, the node receives data for a message from the network, where the node uses time intervals of a clock as a basis for determining scheduled transitions among a plurality of channels associated with the network. While the data for the message is being received and upon completion of an initial portion of the message, the node determines identification information for the message specified in the initial portion. When (i) the identification information specifies that the message is a broadcast message and (ii) an identifier in the message matches a stored identifier of a previously received broadcast message, the node terminates receiving the data for a subsequent portion of the message at least by the next scheduled channel transition time for the network. However, the node may terminate receiving the message before the next scheduled channel transition time.

Alternatively, when (i) the identification information specifies that the message is a broadcast message and (ii) the identifier in the message does not match any stored identifier of a previously received broadcast message, the node continues receiving data for the subsequent portion of the message and stores the identifier for the broadcast message. The node may further re-broadcast, via the network interface, the received message to the network.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The techniques disclosed herein are directed to optimizing broadcast messaging for devices in a network, such as a wireless mesh network defined by the IEEE 802.15.4 family of standards or other possible network types. In an exemplary implementation, a node begins receiving data for a message transmitted via a network. Once an initial portion of the message has been received by the node, but prior to receiving the complete message, the node determines the identification information for the message from the initial portion. For instance, in networks defined by IEEE 802.15.4, the identification information may be derived from fields defined in a frame header and/or packet header for the message, where the headers are transmitted before the payload for the message. Thereafter, the node uses the identification information to determine whether the message being received is a broadcast message (as opposed to a unicast message or other message type) and, if it is a broadcast message, an identifier for the broadcast message. The node then compares the identifier for the broadcast message to a stored identifier of a previously received broadcast message. If the identifier matches a stored identifier, the node terminates reception of the broadcast message since the match indicates that this message (i.e., having the same identifier) had been previously received by the node. By terminating reception of a duplicate broadcast message prior to receiving the entirety of the message, the node can resume the channel hopping schedule for the network sooner thereby reducing the likelihood of missing other network messages (broadcast or otherwise) by having deviated from tuning to the scheduled channel hopping sequence.

As defined herein, a "node" includes an intelligent device capable of performing functions related to distributing messages in a mesh network. In one system, a node can be a meter located at a facility, such as a house or apartment, that measures the consumption of a utility such as gas, water, or electric power. Such a meter can be part of an advanced metering infrastructure (AMI), radio frequency (RF) network. Other examples of nodes include a router, collector or collection point, host computer, hub, or other electronic device that is attached to a network and is capable of sending, receiving, or forwarding information over a communications channel.

A node can contain several components that enable it to function within implementations of the present invention. For example, a node can include a radio that can enable it to communicate with like nodes and/or other devices in the mesh network. The radio of each node may have a programmable logic controller (PLC)-like device that can enable the radio to function like a computer, carrying out computer and command functions to provide implementations of the present invention described herein. A node may also include a storage medium for storing information related to communication with other nodes. Such storage mediums can include a memory, a CD-ROM, DVD, or other storage devices located internal to the node or accessible by the node via a network, for example. A node may also include a crystal oscillator (i.e., a clock) to provide time-keeping and a battery to provide back-up power. Some nodes may be powered only by a battery.

Figure 1:
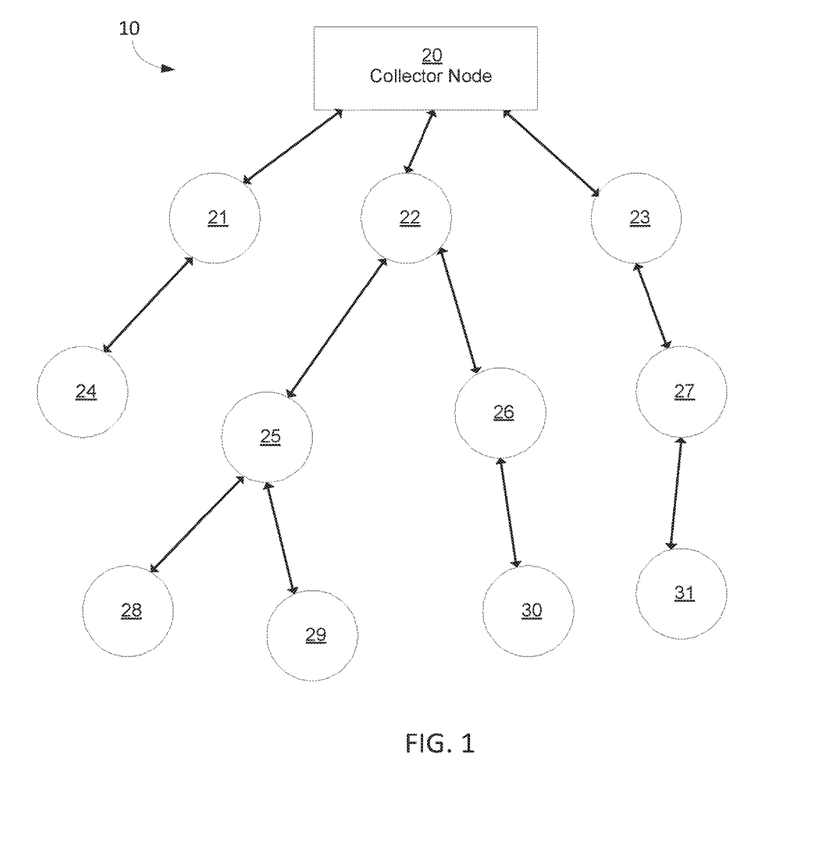
FIG. 1 is a drawing of a mesh network according to various implementations of the present disclosure.

Referring now to the drawings, FIG. 1 depicts an exemplary mesh network 10 in which the techniques described herein may be implemented. The mesh network 10 can include a collector node 20 and radio nodes 21-31. The collector node 20 can serve as a collection point to which the nodes 21-31 may send information, such as measurements of the consumption of gas, water, or electric power at a facility associated with the node. Nodes 21-31, as previously discussed, can have sufficient networking and computing capability to communicate with other nodes in the mesh network and to make intelligent determinations to facilitate such communication. The "collector node" can be configured to have at least the same functionality and capabilities present in nodes 21-31. Additionally, the collector node 20 may include sufficient storage capability for storing information from nodes 21-31 and, in some examples, greater computing capability to process the information received from the nodes. In other examples, a headend system or other computing device (not shown) can be used to communicate with the collector node 20 in order to process the information received from the nodes.

In the network 10, channel hopping may be used such that nodes 20-31 typically communicate data over a designated channel that changes on a scheduled basis, such as in a TSCH network. For example, the network 10 may use a channel hopping sequence of seven different channels with a scheduled channel hop (also referred to as a "transition") on a 25 ms time interval, though other channel sequences and time intervals are possible.

In the network 10, the collector node 20 may, for example, transmit a message addressed as a broadcast message to be received by the nodes 21-31. Some of the broadcast messages exceed the amount of data that can be transmitted in a single frame such that the message spans across two or more frames. In this circumstance, the message is broadcast on the same channel from start until completion, even if the broadcast overlaps with a scheduled channel transition time another time slot for a different channel. For example, the collector node 20 may begin transmitting a broadcast message on the currently scheduled channel (e.g., channel 1), but due to the size of the message and the data rate of the network 10, it takes four time intervals (e.g., 100 ms) to complete transmission of the broadcast message. Thus, while the network 10 is scheduled to operate over four different channels over the four time intervals (e.g., channels 1, 5, 7, 3), the transmitting collector node 20 maintains channel 1 for the entirety of the broadcast of the multi-frame broadcast message. Likewise, the ones of the nodes 21-31 that begin receiving the broadcast message transmitted by the collector node 20 also maintain the current channel (e.g., channel 1) until the transmission is complete, though the nodes 21-31 may not be aware of the size of the broadcast message when the broadcast message begins. As a result, receiving a broadcast message may cause a node 21-31 to temporarily deviate from tuning to the scheduled channel transitions (e.g., to channels 5, 7, 3) and possibly miss other messages that are transmitted by other nodes on the scheduled channels.

Using conventional techniques, the negative effects are amplified for networks that require each node to re-broadcast a received broadcast message to the network. For example, while all the nodes 21-31 may have received the broadcast message from the collector node 20, each of the nodes 21-31 may re-broadcast the message in order to increase the likelihood that the message was propagated to all nodes throughout the network 10. As such, each of the nodes 21-31 iteratively re-broadcasts the message thereby causing the other nodes that are within transmission range to again temporarily deviate from tuning to the scheduled channel hopping sequence in order to receive (potentially many) duplicates of the broadcast message.

Figure 2:
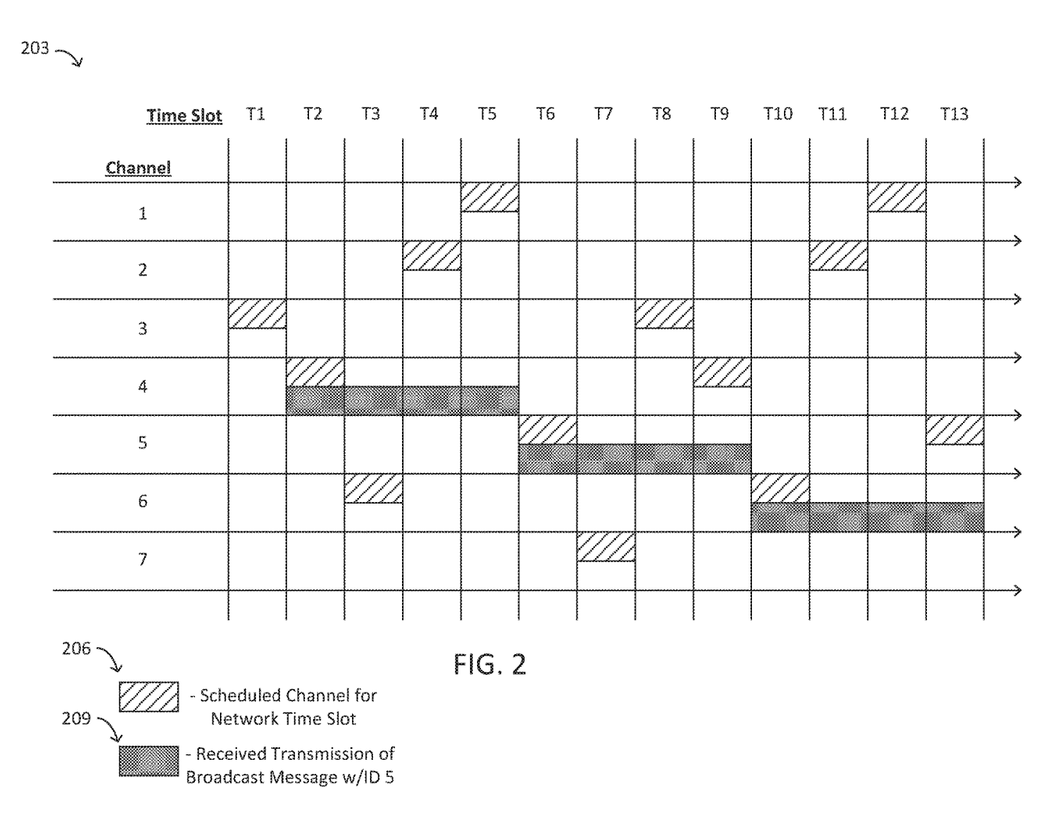
FIG. 2 is an exemplary channel timing diagram for a node in a network illustrating conventional techniques for broadcast messaging.

The diagram 203 of FIG. 2 is an exemplary channel timing diagram for a node (e.g., node 21) that illustrates the channel hopping sequence deviation that occurs when using conventional techniques for broadcast messaging. As shown, one of channels 1-7 is scheduled for each time slot T1-T12, whereby the channel is selected based on a repetition of the scheduled channel hopping sequence [3, 4, 6, 2, 1, 5, 7] that is known to the nodes 20-31. Thus, as shown using instances of the scheduled channel indicator 206, during time slot T1 the network 10 is scheduled to use channel 3 for sending/receiving messages, then during time slot T2 the network is instead scheduled to use channel 4 for sending/receiving messages, and so on for the remainder of the channel hopping sequence.

During time slot T2, a broadcast message having an identifier '5' is transmitted by a node (e.g., collector node 20) on channel 4, where it is received by the node 21 represented in the diagram 203. The reception of the broadcast message by the node 21 is shown by the instance of the received transmission indicator 209 at time slot T2 and channel 4. As the broadcast of the message continues on the same channel (i.e., channel 4) for four time intervals (time slots T2-T5), the node 21 remains tuned to channel 4 to receive the broadcast message despite the different scheduled channels for time slots T3-T5. That is, for time slots T3, T4, and T5, channels 4, 6, and 2, respectively, are scheduled, but the node 21 remains tuned to channel 4 while reception of the broadcast message continues.

Thereafter, at time slot T6 another node (e.g., node 22) in the network 10 begins re-broadcasting the message having the identifier '5', representing the same message transmitted during time slots T2-T5. As discussed above, each of the nodes in the network 10 re-broadcasts a received broadcast message in order to increase the likelihood that the message is propagated to all nodes throughout the network. Since the broadcast begins at time slot T6 and channel 5 is scheduled for this time slot, the broadcast message begins transmission on channel 5. As shown by the received transmission indicator 209 at time slot T6, the node 21 once again begins reception of the broadcast message at time slot T6 and, using conventional techniques, continues receiving the message until transmission of the broadcast message is complete at T9. For time slots T7, T8, and T9, channels 7, 3, and 4, respectively, are scheduled, but the node 21 deviates from this schedule and remains tuned to channel 5 while reception of the broadcast message continues. It should be noted that for illustrative purposes the node 21 is shown immediately resuming the channel hopping sequence at time slot T6 after temporarily deviating from the hopping sequence through time slot T5, but in some instances the node may need additional time to resume the channel hopping sequence following a deviation.

Similarly, at time slot T10 another node (e.g., node 23) in the network 10 begins re-broadcasting the message having the identifier '5', representing the same message transmitted during time slots T2-T5 and T6-T9. Since the broadcast begins at time slot T10 and channel 6 is scheduled for this time slot, the broadcast message begins transmission on channel 6. As shown by the received transmission indicator 209 at time slot T10 and channel 6, the node 21 once again begins reception of the broadcast message at time slot T10 and, using conventional techniques, continues receiving the message until transmission of the broadcast message is complete at T13. For time slots T11, T12, and T13, channels 2, 1, and 5, respectively, are scheduled, but the node 21 deviates from this schedule and remains tuned to channel 6 while reception of the broadcast message continues. It should be noted that for illustrative purposes the node 21 is shown immediately resuming the channel hopping sequence at time slot T10 after temporarily deviating from the hopping sequence through time slot T9, but in some instances the node may need additional time to resume the channel hopping sequence following a deviation. Although not shown in FIG. 2, the remaining nodes in the network 10 will eventually re-broadcast the message thereby increasing the likelihood that the node will miss other messages in the network while it receives more duplicate copies of the broadcast message.

Figure 3:
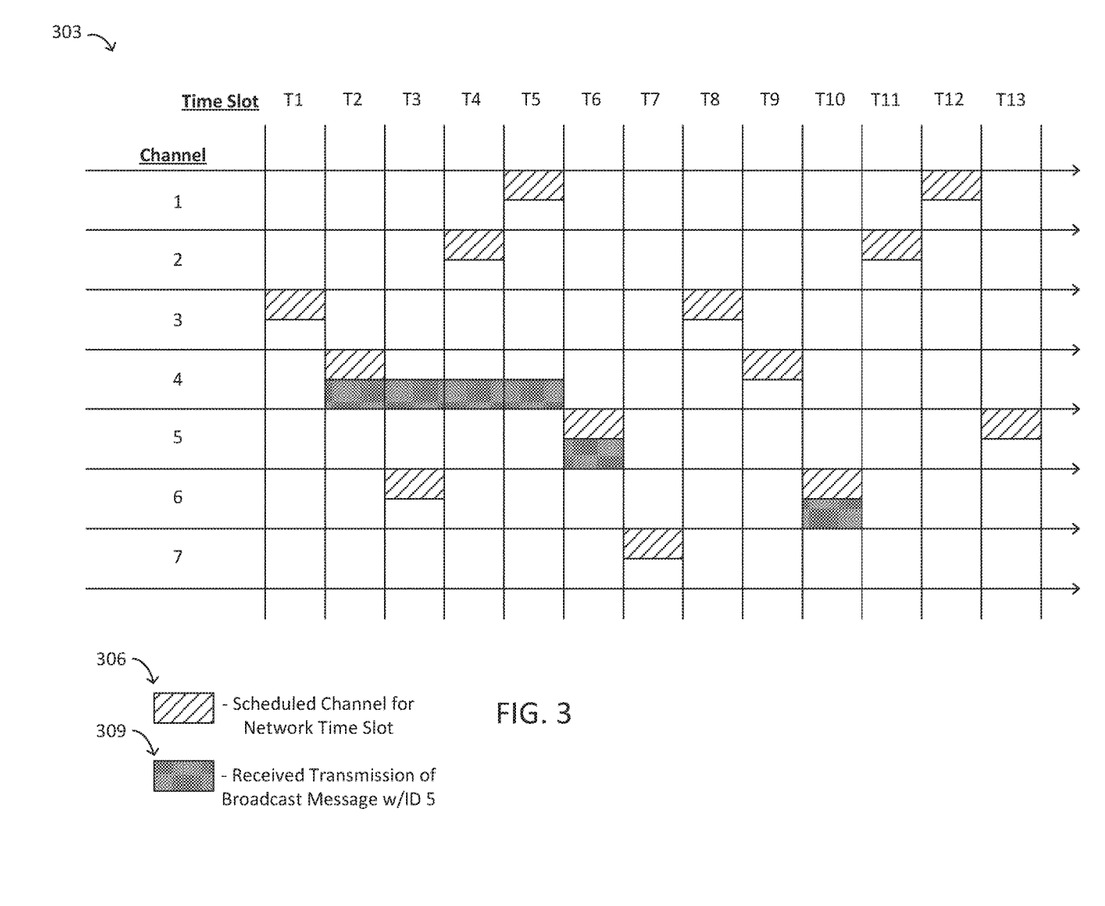
FIG. 3 is an exemplary channel timing diagram for a node in a network according to various implementations of the present disclosure.

Alternatively, the diagram 303 of FIG. 3 is an exemplary channel timing diagram for a node (e.g., node 21) using the techniques disclosed herein for optimizing broadcast messaging. The channels, time slots, and channel hopping sequence presented in the diagram 303 is the same as presented in the diagram 203 (FIG. 2), whereby instances of the scheduled channel indicator 306 are used to indicate the scheduled channel for each time slot. During time slot T2, a broadcast message having an identifier '5' is transmitted by a node (e.g., collector node 20) on channel 4, where it is received by the node 21 represented in the diagram 303. The reception of the broadcast message by the node 21 is shown by the instance of the received transmission indicator 309 at time slot T2 and channel 4. Once an initial portion of the message is received, the node 21 determines identification information for the message, which includes determining that the message is a broadcast message and determining an identifier for the broadcast message. In some implementations, the initial portion of the message is a frame header and/or a packet header for the message that is transmitted prior to the payload of the message. For example, the frame header may be a IEEE 802.15.4 header, while the packet header may be an Internet Protocol (IP) version 6 (IPv6) header. In other implementations, the initial portion is not the complete header(s) for the message, but rather the field(s) of interest that define the message as a broadcast message with a specific identifier. In networks defined by the IEEE 802.15.4 and IPv6 standards, a message can be identified as a broadcast message based upon having a destination address in the frame header of all binary ones, while an identifier for the message may be in a destination address field of a packet header or other field of the message, such as a hop-by-hop options header. In such networks, the destination address and the identifier remains unchanged when re-broadcast by other nodes in the network.

Thereafter, the node 21 compares the identifier for the broadcast message currently being received to any stored identifiers for previously received broadcast messages to determine if the broadcast message is a duplicate. For example, the current broadcast message has an identifier of '5', but the node 21 may have previously received only broadcast messages with identifiers '1', '2', '3', and '4'. Consequently, none of the stored identifiers in the node 21 would match a broadcast message having identifier '5'. As such, the node 21 determines that the broadcast message presently being received has not been previously received, so the node 21 continues receiving the remaining portion of the broadcast message. As the broadcast of the message continues on the same channel (i.e., channel 4) for four time intervals (time slots T2-T5), the node 21 remains tuned to channel 4 to receive the broadcast message despite the different scheduled channels for time slots T3-T5. That is, for time slots T3, T4, and T5, channels 4, 6, and 2, respectively, are scheduled, but the node 21 remains tuned to channel 4 while reception of the broadcast message continues. Once the reception of the broadcast message is complete, the node 21 (along with the other nodes) stores the identifier and re-broadcasts the message in order to increase the likelihood that the message is propagated to all nodes throughout the network. In some implementations, the re-broadcast of the message occurs after some variable delay following reception the message in order to reduce the likelihood of broadcast contention among the other nodes.

Thereafter, at time slot T6 another node (e.g., node 22) in the network 10 begins re-broadcasting the message having the identifier '5'. As the node 21 does not yet know identification information for this message (i.e., only that a message is being transmitted), the node 21 begins receiving the message as represented in the diagram 303 by the instance of the received transmission indicator 309 at time slot T6 and channel 5. Once an initial portion of the message is received, the node 21 determines identification information for the message, which includes determining that the message is a broadcast message and determining an identifier for the broadcast message.

Subsequently, the node 21 compares the identifier for the broadcast message currently being received to any stored identifiers for previously received broadcast messages in order to determine if the broadcast message is a duplicate. For example, the current broadcast message has an identifier of '5'. As the node 21 previously received a broadcast message with the identifier of '5' and stored the identifier, the stored identifier would be a match for the identifier of the current broadcast message. As such, based on the identifier, the node 21 determines that the broadcast message is a duplicate of a previously received broadcast message, so the node 21 terminates receiving the remaining portion of the broadcast message at least by the next scheduled channel transition to time slot T7. In some implementations, the node 21 terminates receiving the broadcast message at some point prior to the end of the T6 time slot (e.g., immediately upon determining the message is a duplicate). In other implementations, the node 21 may continue receiving the duplicate broadcast message for the remainder of the T6 time slot, and terminate receiving the message by transitioning to the scheduled channel for the next time slot (i.e., transitioning to channel 7 at time slot T7).

Thus, although the broadcast of the message may continue on the same channel (i.e., channel 5) for four time intervals (time slots T6-T9), the node 21 resumes following the scheduled channel transitions at the next time slot (T7)

and does not remain tuned to channel 5 on which the broadcast message was being received.

At time slot T10 another node (e.g., node 23) in the network 10 begins re-broadcasting the message having the identifier '5'. As the node 21 does not yet know identification information for this message (i.e., only that a message is being transmitted), the node 21 begins receiving the message as represented in the diagram 303 by the instance of the received transmission indicator 309 at time slot T10 and channel 6. Once an initial portion of the message is received, the node 21 determines identification information for the message, which includes determining that the message is a broadcast message and determining an identifier for the broadcast message.

Subsequently, the node 21 compares the identifier for the broadcast message currently being received to any stored identifiers for previously received broadcast messages in order to determine if the broadcast message is a duplicate. For example, the current broadcast message has an identifier of '5'. As the node 21 previously received a broadcast message with the identifier of '5' and stored the identifier, the stored identifier would be a match for the identifier of the current broadcast message. As such, based on the identifier, the node 21 determines that the broadcast message is a duplicate of a previously received broadcast message, so the node 21 terminates receiving the remaining portion of the broadcast message at least by the next scheduled channel transition to time slot T11. In some implementations, the node 21 terminates receiving the broadcast message at some point prior to the end of the T10 time slot (e.g., immediately upon determining the message is a duplicate). In other implementations, the node 21 may continue receiving the duplicate broadcast message for the remainder of the T10 time slot, and terminate receiving the message by transitioning to the scheduled channel for the next time slot (i.e., transitioning to channel 2 at time slot T11).

Thus, although the broadcast of the message may continue on the same channel (i.e., channel 6) for four time intervals (time slots T10-T13), the node 21 resumes following the scheduled channel transitions at the next time slot (T11) and does not remain tuned to channel 6 on which the broadcast message was being received. As a consequence of tuning to the scheduled channel transitions, the node 21 has a reduced likelihood of missing data transmissions on scheduled channels as a result of deviating from the channel schedule.

Figure 4:
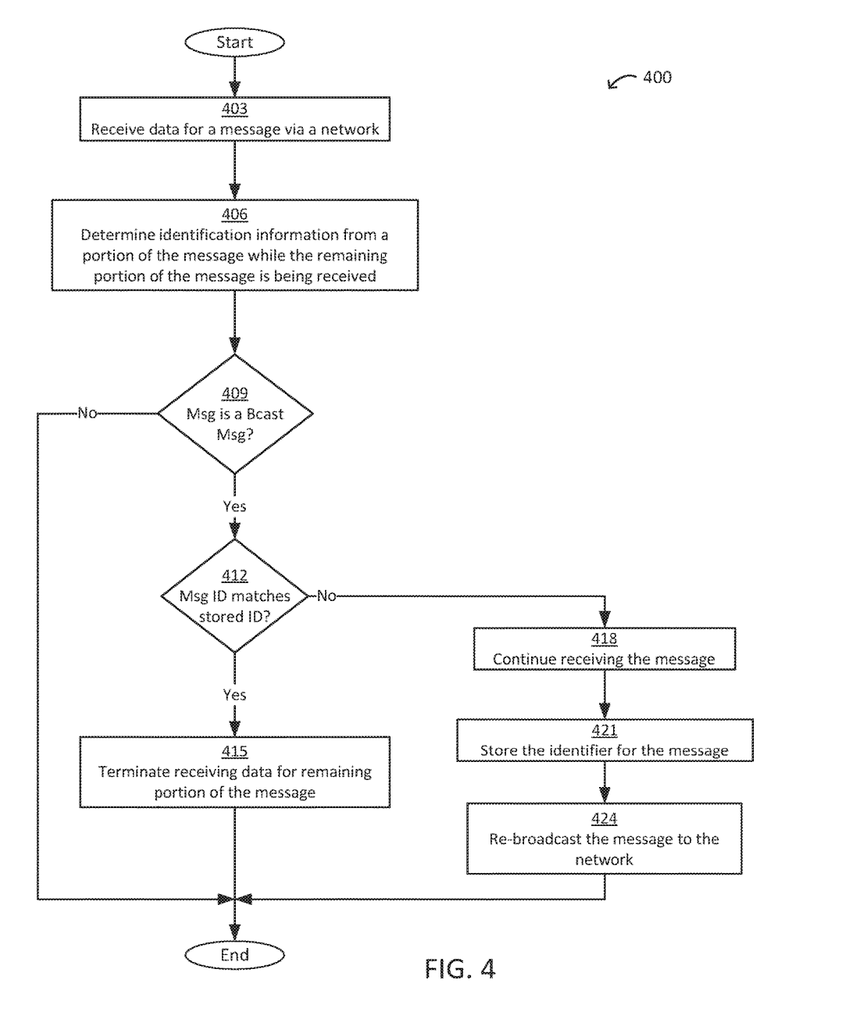
FIG. 4 is a flowchart illustrating one example of functionality implemented by a node in the network of FIG. 1 according to various implementations of the present disclosure.

Referring next to FIG. 4, shown is a flowchart that provides one example of the broadcast messaging optimization operations for a method 400 of a node 20-31 (FIG. 1) in the network 10 (FIG. 1) according to various embodiments. It is understood that the flowchart of FIG. 4 provides merely an example of the many different types of functional arrangements that may be employed to implement the broadcast messaging optimization operations of the method 400 as described herein. The operations depicted in the flowchart of FIG. 4 may be initiated by a node 20-31 in the network 10 in response to transmission of a message in the network.

Beginning in block 403, a node begins receiving data for a message transmitted via the network. From the perspective of the receiving node, the message to be received may be a broadcast message, a unicast message, or other type of network message as can be appreciated.

Once an initial portion of the message is received, in block 406, the node determines identification information for the message while the message is being received. In some implementations, the initial portion of the message is a frame header and/or a packet header for the message that is transmitted prior to the payload of the message. For example, the frame header may be a IEEE 802.15.4 header, while the packet header may be an IPv6 header. In other implementations, the initial portion is not the complete header(s) for the message, but rather the field(s) of interest from the header(s) that may define the message as a broadcast message with a specific identifier. For example, in networks defined by the IEEE 802.15.4 and IPv6 standards, a message can be identified as a broadcast message based upon having a destination address in the frame header of all binary ones, while an identifier for the message may be in a destination address field of a packet header or other field of the message, such as a hop-by-hop options header. In such networks, the destination address and the identifier remains unchanged when re-broadcast by other nodes in the network.

Next, in block 409, the node determines whether the message currently being received is a broadcast message. For example, in networks defined by the IEEE 802.15.4 family of standards, a message can be identified as a broadcast message based upon having a destination address field in the frame header of all binary ones, where the destination address field can be 64-bits or 16-bits (i.e., FF-FF-FF-FF-FF-FF-FF-FF or FF-FF). If the destination address field has something other binary ones in the destination address field, it may be presumed to be a unicast message or other message type. However, various message types and techniques for identifying such messages may be possible for different network types. Continuing, if the message currently being received is not a broadcast message (e.g., a unicast message), this portion of the execution of method 400 in the node ends as shown, whereby other functionality may be executed in the node for handling such non-broadcast messages. Alternatively, if the message currently being received is a broadcast message, the method 400 proceeds to block 412.

In block 412, the node determines whether an identifier for the broadcast message matches any identifiers stored in the node from previously received broadcast messages. In networks defined by the IEEE 802.15.4 and IPv6 standards, an identifier for the broadcast message may be determined based upon a destination address field of a packet header or other field of the message, such as a hop-by-hop options header. However, other techniques for identifying messages may be possible for the various different network types. For example, if the broadcast message currently being received is determined to have an identifier of '5', but the node has stored only identifiers '1', '2', '3', and '4' for previously received broadcast messages, then none of the stored identifiers in the node would match a broadcast message having identifier '5'. As such, the node uses the stored identifiers to determine whether the broadcast message presently being received has been previously received.

Thus, if the stored identifier matches the identifier of the broadcast message currently being received (i.e., the broadcast message is a duplicate), in block 415, the node terminates receiving the remaining portion of the broadcast message at least by the next scheduled channel transition time. In some implementations, the node terminates receiving the broadcast message at some point prior to the end of the current time slot (e.g., immediately upon determining the message is a duplicate). In other implementations, the node may continue receiving the duplicate broadcast message for the remainder of the current time slot, and terminate receiving the message by transitioning to the scheduled channel for the next time slot. Thereafter, this portion of the execution of the method 400 in the node ends as shown.

Alternatively, if none of the stored identifiers match the identifier of the broadcast message currently being received (i.e., the broadcast message is not a duplicate), the method 400 proceeds to block 418 where the node continues receiving the remaining portion of the broadcast message. As the broadcast of the message continues on the same channel until completion, the node remains tuned to this channel to receive the broadcast message despite temporarily deviating from tuning to the scheduled channels for subsequent time slots.

Once the reception of the broadcast message is complete, in block 421, the node stores the identifier for the message in memory for comparison to future broadcast messages that are received. Then, in block 424, the node re-broadcasts the message in order to increase the likelihood that the message is propagated to all nodes throughout the network. In some implementations, the re-broadcast of the message occurs after some variable delay following reception of the message in order to reduce the likelihood of broadcast contention among the other nodes. Thereafter, this portion of the execution of the method 400 in the node ends as shown.

Figure 5:
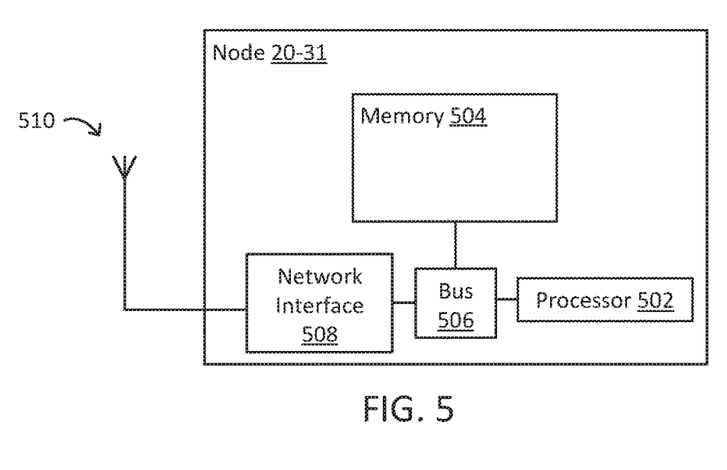
FIG. 5 is a schematic block diagram that provides one example illustration of a node employed in the network of FIG. 1 according to various implementations of the present disclosure.

Next, in FIG. 5, shown is a block diagram depicting an example of a node 20-31 used for implementing the techniques disclosed herein within a wireless mesh network or other data network. The node 20-31 can include a processing device 502. Non-limiting examples of the processing device 502 include a microprocessor, an application-specific integrated circuit ("ASIC"), a state machine, or other suitable processing device. The processing device 502 can include any number of processing devices, including one. The processing device 502 can be communicatively coupled to computer-readable media, such as memory device 504. The processing device 502 can execute computer-executable program instructions and/or access information respectively stored in the memory device 504.

The memory device 504 can store instructions that, when executed by the processing device 502, cause the processing device 502 to perform operations described herein. The memory device 504 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The nodes 20-31 can include a bus 506 that can communicatively couple one or more components of the node 20-31. Although the processor 502, the memory 504, and the bus 506 are depicted in FIG. 5 as separate components in communication with one another, other implementations are possible. For example, the processor 502, the memory 504, and the bus 506 can be components of printed circuit boards or other suitable devices that can be disposed in a node 20-31 to store and execute programming code.

The nodes 20-31 can also include network interface device 508. The network interface device 508 can be a transceiving device configured to establish a one or more of the wireless communication links via an antenna 510. A non-limiting example of the network interface device 508 is an RF transceiver and can include one or more components for establishing a communication links to other nodes 20-31 in the mesh network 10.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multi-purpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A method for optimizing broadcast messaging for a node in a network, the method comprising:
   receiving, via a network interface in the node, data for a message from the network, wherein the node uses time intervals of a clock as a basis for determining scheduled transitions among a plurality of channels associated with the network; and
   while the data for the message is being received and upon completion of an initial portion of the message:
      determining, in the node, identification information for the message specified in the initial portion;
      when (i) the identification information specifies that the message is a broadcast message and (ii) an identifier in the message matches a stored identifier of a previously received broadcast message, terminating said receiving the data for a subsequent portion of the message at least by the next scheduled channel transition time for the network; and
      when (i) the identification information specifies that the message is a broadcast message and (ii) the identifier in the message does not match any stored identifier of a previously received broadcast message:
         continuing said receiving data for the subsequent portion of the message;
         storing, in the node, the identifier for the broadcast message; and
         re-broadcasting, via the network interface, the received message to the network.

2. The method of claim 1, wherein the initial portion of the message includes a frame header and a packet header.

3. The method of claim 2, wherein said determining the identification information for the message comprises:
   determining whether the message is a broadcast message based upon a destination address field in the frame header for the message; and
   determining the identifier based upon a field in the packet header for the message.

4. The method of claim 1, wherein the network uses the Institute of Electrical and Electronics Engineers (IEEE) 802.15.4 standards.

5. The method of claim 1, wherein said re-broadcasting the message occurs subsequent to the node completely receiving all portions of the message followed by some delay.

6. The method of claim 1, further comprising:
   maintaining a current channel of the network while the message is being received beyond the next scheduled channel transition time when the identifier of the broadcast message does not match the stored identifier; and
   transitioning to a scheduled channel at the next scheduled channel transition time when the identifier of the broadcast message matches the stored identifier.

7. The method of claim 1, wherein, when the identifier in the broadcast message matches the stored identifier, terminating said receiving the data for the message before the next scheduled transition time.

8. A non-transitory computer-readable medium embodying a program executable in a node, the program comprising code that:
   receives, via a network interface in the node, data for a message from a network, wherein the node uses time intervals of a clock as a basis for determining scheduled transitions among a plurality of channels associated with the network; and
   while the data for the message is being received and upon completion of an initial portion of the message:
      determines identification information for the message specified in the initial portion;
      when (i) the identification information specifies that the message is a broadcast message and (ii) an identifier in the message matches a stored identifier of a previously received broadcast message, terminates said receiving the data for a subsequent portion of the message at least by the next scheduled channel transition time for the network; and
      when (i) the identification information specifies that the message is a broadcast message and (ii) the identifier in the message does not match any stored identifier of a previously received broadcast message:
         continues said receiving data for the subsequent portion of the message; and
         stores, in the node, the identifier for the broadcast message.

9. The non-transitory computer-readable medium of claim 8, wherein the initial portion of the message includes a frame header and a packet header.

10. The non-transitory computer-readable medium of claim 9, wherein said determining the identification information for the message comprises:
    determining whether the message is a broadcast message based upon a destination address field in the frame header for the message; and
    determining the identifier based upon a field in the packet header for the message.

11. The non-transitory computer-readable medium of claim 8, wherein the program further comprises code that re-broadcasts, via the network interface, the received message to the network.

12. The non-transitory computer-readable medium of claim 11, wherein said re-broadcasting the message occurs subsequent to the node completely receiving all portions of the message followed by some delay.

13. The non-transitory computer-readable medium of claim 8, further comprising code that:
    maintains a current channel of the network while the message is being received beyond the next scheduled channel transition time when the identifier of the broadcast message does not match the stored identifier; and
    transitions to a scheduled channel at the next scheduled channel transition time when the identifier of the broadcast message matches the stored identifier.

14. The non-transitory computer-readable medium of claim 8, wherein, when the identifier in the broadcast message matches the stored identifier, terminating said receiving the data for the message before the next scheduled transition time.

15. A node, comprising:
a processor;
a network interface for communicating on a network; and
a memory configured by a broadcast messaging optimization application executed in the node, the broadcast messaging optimization application causing the node to:
  receive, via the network interface, data for a message from the network, wherein the node uses time intervals of a clock as a basis for determining scheduled transitions among a plurality of channels associated with the network; and
  while the data for the message is being received and upon completion of an initial portion of the message:
    determine identification information for the message specified in the initial portion;
    when (i) the identification information specifies that the message is a broadcast message and (ii) an identifier in the message matches a stored identifier of a previously received broadcast message, terminate said receiving the data for a subsequent portion of the message at least by the next scheduled channel transition time for the network; and
    when (i) the identification information specifies that the message is a broadcast message and (ii) the identifier in the message does not match any stored identifier of a previously received broadcast message:
      continue said receiving data for the subsequent portion of the message;
      store, in the memory, the identifier for the broadcast message; and
      re-broadcast, via the network interface, the received message to the network.

16. The node of claim 15, wherein the initial portion of the message includes a frame header and a packet header.

17. The node of claim 16, wherein said determining the identification information for the message comprises:
  determining whether the message is a broadcast message based upon a destination address field in the frame header for the message; and
  determining the identifier based upon a field in the packet header for the message.

18. The node of claim 15, further comprising:
  maintaining a current channel of the network while the message is being received beyond the next scheduled channel transition time when the identifier of the broadcast message does not match the stored identifier; and
  transitioning to a scheduled channel at the next scheduled channel transition time when the identifier of the broadcast message matches the stored identifier.

19. The node of claim 15, wherein, when the identifier in the broadcast message matches the stored identifier, terminating said receiving the data for the message before the next scheduled transition time.

20. The node of claim 15, wherein said re-broadcasting the message occurs subsequent to the node completely receiving all portions of the message followed by some delay.

* * * * *